(12) United States Patent
Tazume

(10) Patent No.: US 12,118,502 B2
(45) Date of Patent: Oct. 15, 2024

(54) DELIVERY PORT MANAGEMENT SYSTEM, DELIVERY PORT MANAGEMENT METHOD, AND PROGRAM

(71) Applicant: RAKUTEN GROUP, INC., Tokyo (JP)

(72) Inventor: Toshiaki Tazume, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 820 days.

(21) Appl. No.: 16/976,760

(22) PCT Filed: Sep. 18, 2019

(86) PCT No.: PCT/JP2019/036611
§ 371 (c)(1),
(2) Date: Aug. 31, 2020

(87) PCT Pub. No.: WO2021/053762
PCT Pub. Date: Mar. 25, 2021

(65) Prior Publication Data
US 2022/0019971 A1    Jan. 20, 2022

(51) Int. Cl.
*G06Q 10/0835*    (2023.01)
*B64U 10/16*    (2023.01)
(Continued)

(52) U.S. Cl.
CPC ..... *G06Q 10/08355* (2013.01); *G08G 5/0069* (2013.01); *B64U 10/16* (2023.01); *B64U 2101/64* (2023.01)

(58) Field of Classification Search
CPC ............ G06Q 10/08355; G01C 21/26; G08G 5/0069; G08G 5/0039; G08G 5/006
See application file for complete search history.

(56) References Cited

U.S. PATENT DOCUMENTS

| 10,353,388 B2 * | 7/2019 | Schubert | G08G 5/0069 |
| 2004/0193502 A1 * | 9/2004 | Heitner | G06Q 10/08 |
| | | | 705/28 |

(Continued)

FOREIGN PATENT DOCUMENTS

| CN | 106570667 A | 4/2017 |
| CN | 110096072 A | 8/2019 |
| JP | 2018148992 A | 9/2018 |

OTHER PUBLICATIONS

Huang et al., "A Path Planning Algorithm for Smooth Trajectories of Unmanned Aerial Vehicles via Potential Fields" (published in 2018 15th International Conference on Control, Automation, Robotics and Vision (ICARCV), pp. 1677-1684) (Year: 2018).*

(Continued)

*Primary Examiner* — Resha Desai
*Assistant Examiner* — Patrick Kim
(74) *Attorney, Agent, or Firm* — HEA LAW PLLC

(57) ABSTRACT

To improve utilization efficiency of a delivery port and an unmanned aerial vehicle (UAV), a delivery port management system includes obtaining means for obtaining a delivery destination of a package that is transported by a UAV approaching a facility having a plurality of delivery ports and a plurality of delivery destinations, the delivery ports receiving packages, port selecting means for selecting a delivery port to which the UAV delivers the package among the plurality of delivery ports based on the delivery destination of the package after the UAV has departed for the facility, and guiding means for sending information for guiding the UAV to the selected delivery port.

15 Claims, 10 Drawing Sheets

(51) Int. Cl.
   *B64U 101/64*   (2023.01)
   *G08G 5/00*   (2006.01)

(56) References Cited

U.S. PATENT DOCUMENTS

| | | | | |
|---|---|---|---|---|
| 2015/0336668 A1* | 11/2015 | Pasko | .................... | B64C 39/024 |
| | | | | 701/2 |
| 2018/0065759 A1* | 3/2018 | Michalski | .............. | G05D 1/654 |
| 2019/0147751 A1* | 5/2019 | Sasao | .................. | G08G 5/0021 |
| | | | | 701/3 |
| 2019/0233102 A1 | 8/2019 | Kaneichi et al. | | |

OTHER PUBLICATIONS

Office Action of Feb. 11, 2022, for corresponding CN Patent Application No. 201980023614.2 with partial translation, pp. 1-13.

\* cited by examiner

FIG.3

| ATTRIBUTES/DELIVERY PORTS | 4a | 4b | 4c | 4d | 4e | 4f |
|---|---|---|---|---|---|---|
| POSITION | 12F SW | 10F ES | 7F CENTER | 6F NE | 4F SW | 2F ES |
| ALLOWABLE SIZE | REGULAR | REGULAR | REGULAR | REGULAR | REGULAR | SMALL |
| CHARGE AVAILABILITY | NO | NO | NO | YES | NO | NO |
| APPROACHABLE DIRECTION | S | S | EW | EW | S | SN |
| POSSIBILITY OF DROPPING PACKAGE | NO | NO | YES | YES | NO | NO |

DELIVERY PORT MANAGEMENT SYSTEM, DELIVERY PORT MANAGEMENT METHOD, AND PROGRAM

CROSS REFERENCE TO RELATED APPLICATIONS

This application is a National Stage of International Application No. PCT/JP2019/036611 filed on Sep. 18, 2019. The contents of the above document is incorporated herein by reference in its entirety.

TECHNICAL FIELD

The present invention relates to a delivery port management system, a delivery port management method, and a program.

BACKGROUND ART

The development of technology to deliver packages using an unmanned aerial vehicle (UAV) is advanced. In package transportation using a UAV, a flight route from a departure point to a port to deliver a package is prepared in advance, and the UAV is then controlled to fly according to the flight route.

JP2018-148992A discloses providing a container for receiving goods at building windows, balconies, and terraces, for example, receiving and collating a key signal from the UAV, and, if the key signal is collated and authenticated, outputting guidance signals for guiding the UAV to a delivery position.

SUMMARY OF INVENTION

Technical Problem

The inventors are considering using a UAV to deliver goods to facilities with residences to be many delivery destinations, such as large residential facilities. The facility with many delivery destinations may be provided with a plurality of delivery ports.

On the other hand, if the port to which the package is delivered is determined and reserved at the time of the UAV's departure, there is a large deviation from the actual travel time, and thus it is necessary to widen a period of time for reserving the port or to wait around the port when it is reserved by another UAV. This results in reducing utilization efficiency of the port or the UAV.

One or more embodiments of the present invention have been conceived in view of the above, and an object thereof is to provide a technique that can improve utilization efficiency of a delivery port and a UAV.

Solution to Problem

In order to solve the above described problems, a delivery port management system according to the present invention includes obtaining means for obtaining a delivery destination of a package that is transported by an unmanned aerial vehicle (UAV) approaching a facility having a plurality of delivery ports and a plurality of delivery destinations, the delivery ports receiving packages, port selecting means for selecting a delivery port to which the UAV delivers the package among the plurality of delivery ports based on the delivery destination of the package after the UAV has departed for the facility, and guiding means for sending information for guiding the UAV to the selected delivery port.

A delivery port management method according to the present invention includes obtaining a delivery destination of a package that is transported by a UAV approaching a facility having a plurality of delivery ports and a plurality of delivery destinations, the delivery ports receiving packages, selecting a delivery port to which the UAV delivers the package among the plurality of delivery ports based on the delivery destination of the package after the UAV has departed for the facility, and sending information for guiding the UAV to the selected delivery port.

A program according to the present invention causes a computer to function as obtaining means for obtaining a delivery destination of a package that is transported by a UAV approaching a facility having a plurality of delivery ports and a plurality of delivery destinations, the delivery ports receiving packages, port selecting means for selecting a delivery port to which the UAV delivers the package among the plurality of delivery ports based on the delivery destination of the package after the UAV has departed for the facility, and guiding means for sending information for guiding the UAV to the selected delivery port.

In one aspect of the present invention, the port selecting means selects the delivery port to which the UAV delivers the package after the UAV has reached an area that is set according to the facility.

In one aspect of the present invention, the delivery port management system may further include route generating means for generating a flight route for the UAV to reach the selected delivery port.

In one aspect of the present invention, the route generating means may generate the flight route based on a current position of the UAV and the selected delivery port.

In one aspect of the present invention, the route generating means may generate the flight route that avoids an obstacle in the facility and reaches the selected delivery port.

In one aspect of the present invention, after the UAV has departed for the facility, the port selecting means may select the delivery port to which the UAV delivers the package based on the delivery destination of the package and the current position of the UAV from the plurality of delivery ports.

In one aspect of the present invention, the delivery port management system may further include delivery position obtaining means for obtaining a position of a delivery vehicle that delivers a package received at one of the plurality of delivery ports to a delivery destination. The port selecting means may select the delivery port to which the approaching UAV delivers the package based on the delivery destination of the package and the position of the delivery vehicle from the plurality of delivery ports.

In one aspect of the present invention, the port selecting means may evaluate a route for the delivery vehicle to reach the delivery destination through each of the plurality of delivery ports, and select a delivery port to deliver the package from the plurality of delivery ports based on the evaluation.

Effects of the Invention

The present invention can improve utilization efficiency of a delivery port and a UAV.

BRIEF DESCRIPTION OF THE DRAWINGS

FIG. 3 is a diagram illustrating an example of attributes of a delivery port;

DESCRIPTION OF EMBODIMENTS

Figure 1:
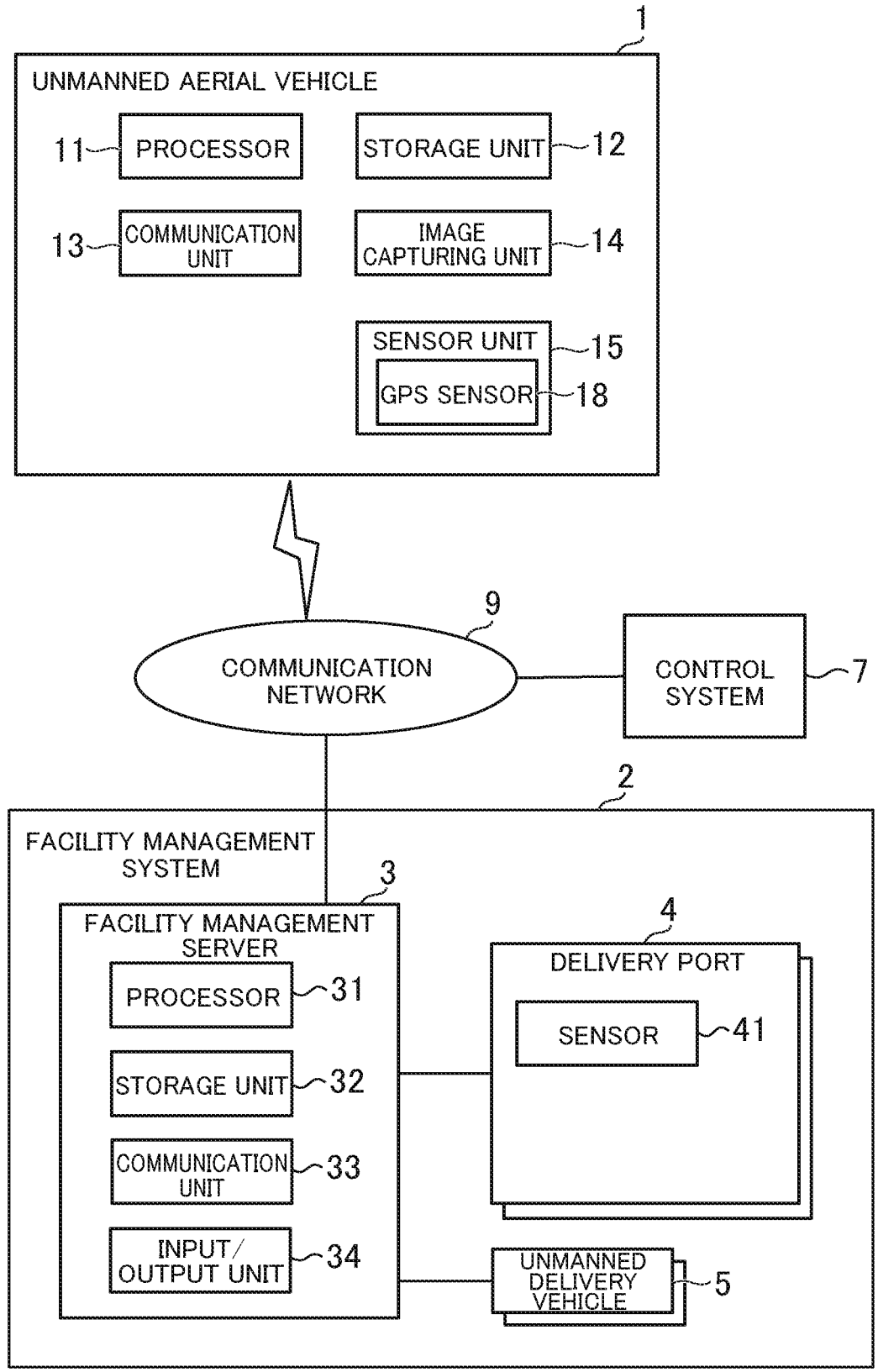
FIG. 1 is a diagram illustrating an overall configuration of a transportation management system according to an embodiment of the present invention.

Embodiments of the present invention will be described below with reference to the accompanying drawings. For the elements denoted by the same reference characters, the repetitive descriptions are omitted. In this embodiment, as an example of the delivery port management system, a transportation management system including UAVs and a system for managing packages to be delivered to large-scale facilities.

FIG. 1 is a diagram illustrating an overall configuration of the transportation management system. As shown in FIG. 1, the transportation management system includes a UAV 1, a facility management system 2, and a control system 7.

The UAV 1 is an aircraft on which a person does not board, such as an unmanned aerial vehicle driven by a battery (what is called "drone") and an unmanned aerial vehicle driven by an engine. The UAV 1 is communicatively connected to a communication network 9 via wireless communications using a communication standard such as LTE (Long Term Evolution). The UAV 1 flies according to a flight route 71 (see FIG. 10) indicated by the control system 7 and the facility management system 2. The UAV 1 can hold a package such as goods and mail, and flies to a facility with a destination to deliver the package, and flies to a destination to collect a package.

The facility management system 2 is provided in a facility such as a large-scale apartment house. The facility management system 2 includes a facility management server 3, a plurality of delivery ports 4, and one or more unmanned delivery vehicles 5. The facility management server 3 is communicatively connected to the communication network 9, and the facility management server 3 communicates with the delivery port 4 and the unmanned delivery vehicle 5. The facility management system 2 manages the delivery port 4 and the unmanned delivery vehicle 5, and also manages the flight of the UAV 1 when the UAV 1 approaches the facility.

The delivery port 4 is provided in the facility. The delivery port 4 is a facility for receiving packages from the UAV 1. The delivery port 4 may be a drone port where a drone can take off and land, or a place where packages are dropped from the UAV 1. The delivery port 4 receives the package from the UAV 1. The delivery port 4 includes a sensor 41 for detecting whether an obstacle that may hinder the use of the UAV 1, such as a package or an intruder, is in the delivery port 4, and the output of the sensor 41 is sent to the facility management server 3.

The unmanned delivery vehicle 5 can autonomously travel, and delivers the package received at the delivery port 4 to the delivery destination. The received package may be manually delivered to the delivery destination or moved to a storage site where a user comes to receive it.

The control system 7 controls the flight of the UAV 1. In this regard, the facility management system 2 manages the approach of the UAV 1 to the facility.

The facility management server 3 of the facility management system 2 may be a server computer or a personal computer, for example. The facility management server 3 includes a processor 31, a storage unit 32, a communication unit 33, and an input/output unit 34.

The processor 31 executes processing according to programs or data stored in the storage unit 32. The processor 31 controls the communication unit 33 and the input/output unit 34.

The storage unit 32 includes a volatile memory such as a RAM, and a nonvolatile memory such as a flash memory. The storage unit 32 may also include a storage device such as a hard disk. The storage unit 32 stores the program. The storage unit 32 stores information and calculation results entered from the processor 31, the communication unit 33, and the input/output unit 34. The program may be provided through the Internet, for example, or may be stored in and provided through a computer-readable information storage medium, such as a flash memory and a DVD-ROM.

The communication unit 33 includes, for example, an integrated circuit implementing a communication interface for wired or wireless communication. The communication unit 33 inputs information received from other devices into the processor 31 and the storage unit 32 based on the control of the processor 31, and sends the information to the other devices. In the example of FIG. 1, the communication unit 33 communicates with the communication network 9, although the communication unit 33 may be connected to an antenna and directly communicate with the UAV 1 using the same wireless communication system as that of the UAV 1 thorough an antenna and the communication unit 13 of the UAV 1.

The input/output unit 34 includes, for example, a video controller that controls a display output device and a controller that obtains data from an input device. Examples of the input device includes a touch panel, a keyboard, and a mouse, for example. The input/output unit 34 outputs display data to the display output device based on the control of the processor 31, and acquires the data entered when a user operates the input device. The display output device is a display device, for example.

The UAV 1 includes a processor 11, a storage unit 12, a communication unit 13, an image capturing unit 14, and a sensor unit 15. The sensor unit 15 includes a GPS sensor 18. The UAV 1 also includes, for example, propellers, a motor (an example of actuator), a battery, and an antenna, which are omitted here.

The processor 11 executes processing according to programs or data stored in the storage unit 12. The processor 11 controls the communication unit 13, the image capturing unit 14, and the sensor unit 15.

The storage unit 12 includes a volatile memory such as a RAM, and a nonvolatile memory such as a flash memory. The storage unit 12 may also include a storage device such as a hard disk. The storage unit 12 stores the program. The storage unit 12 stores information and calculation results entered from the processor 11, the communication unit 13, the image capturing unit 14, and the sensor unit 15.

The communication unit 13 includes, for example, an integrated circuit implementing a communication interface for wired or wireless communication. The communication unit 13 is communicatively connected to the communication network 9 by a predetermined wireless communication system (e.g., LTE), and communicates with the control system 7 and the facility management system 2. The wireless communication system may be a wireless LAN, Bluetooth (registered trademark), iBeacon (registered trademark), or Wi-Fi Direct (registered trademark). Alternatively, the UAV 1 may be directly connected to the facility management system 2 thorough an antenna of the UAV 1 and an antenna of the facility management system 2.

The image capturing unit 14 is at least one camera. For example, the image capturing unit 14 includes an image pickup element such as a CCD image sensor and a CMOS image sensor, and stores an image captured by the image pickup element as digital data. The image may be a still image or a moving image. The image capturing unit 14 may not be included in the UAV 1.

The sensor unit 15 includes the GPS sensor 18, for example. The GPS sensor 18 includes a receiver for receiving a signal from a satellite, and detects position information based on the signal received by the receiver, for example. The position information is latitude/longitude information, and coordinate information on the earth, for example. The sensor section 15 may further include any sensor, such as an infrared ray sensor, ultrasonic sensor, audio sensor (microphone), accelerometer, gyro sensor, wind sensor, geomagnetic sensor, altitude sensor, displacement sensor, pressure sensor, temperature sensor, or motor encoder (rotation position sensor).

Figure 2:
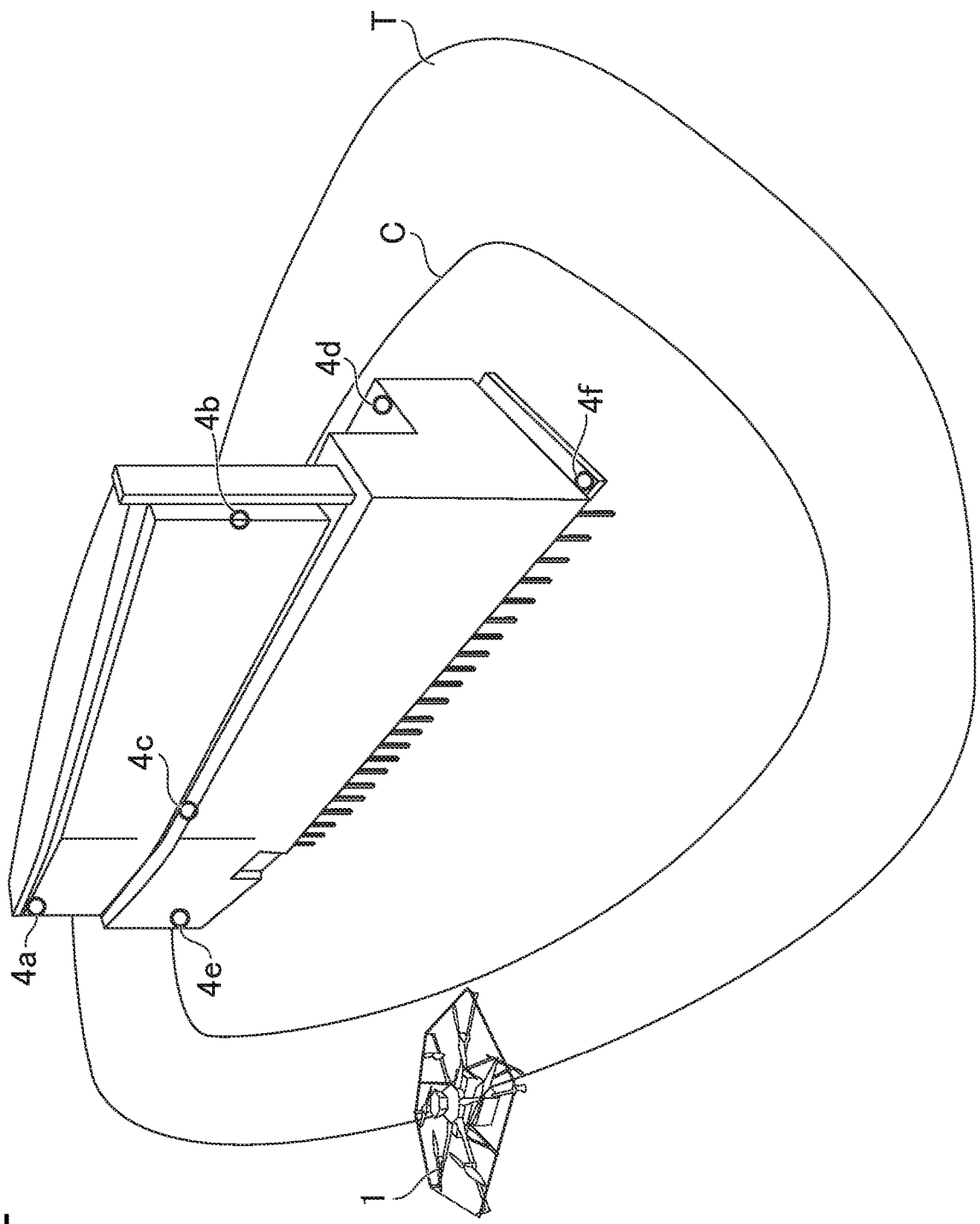
FIG. 2 is a diagram illustrating an example of the facility.

Next, a facility to be managed by the facility management system 2 will be described. FIG. 2 is a diagram illustrating an example of the facility. The facility is an apartment house with a plurality of residences. The facility may be an office building in which a plurality of businesses reside. A facility management area C where the facility management system 2 manages the flight of the UAV 1 is located around the facility, and an area where the control system 7 manages the flight of the UAV 1 is located outside the facility management area C.

In the example of FIG. 2, an annular connection area T is provided between the facility management area C and the area managed by the control system 7. When the UAV 1 reaches the connection area T (correspond to approaching the facility), the processing for delivering the package to the delivery port 4 of the facility is performed. The connection area T may not be provided in all directions around the facility management area C. For example, island shaped connection areas T may be provided at some locations. In this case, the control system 7 controls the UAV 1 to fly to one of the island shaped connection areas T, and when the UAV reaches such a connection area T, the processing for delivering the package to the delivery port 4 of the facility is performed. In the connection area T, management of the flight of the UAV 1 is switched between the control system 7 and the facility management system 2.

In the example of FIG. 2, the delivery ports 4a, 4b, 4c, 4d, 4e, and 4f are distributed in the facility. FIG. 3 shows attributes of the delivery ports 4. The information shown in the table of FIG. 3 is stored in the storage unit 32.

In the examples of FIGS. 2 and 3, the delivery ports 4 are located in different floors. Further, the delivery ports are disposed so as to be distributed also in the planar direction of the facility. For simplicity, FIG. 3 shows only the directions within the facility, but coordinates of latitude and longitude may be stored instead. The allowable size indicates a size of the UAV 1 that can land on or pass through the delivery port 4. If the size of the delivery port 4 is small, only a small-sized drone for carrying a small-sized package can deliver the package there. The charge availability indicates whether equipment for charging the UAV 1 is installed in the delivery port 4.

The approachable direction indicates a range of a direction by which the UAV 1 is allowed to enter the delivery port 4. The possibility of dropping package indicates whether the UAV 1 can drop the package in the sky.

Figure 4:
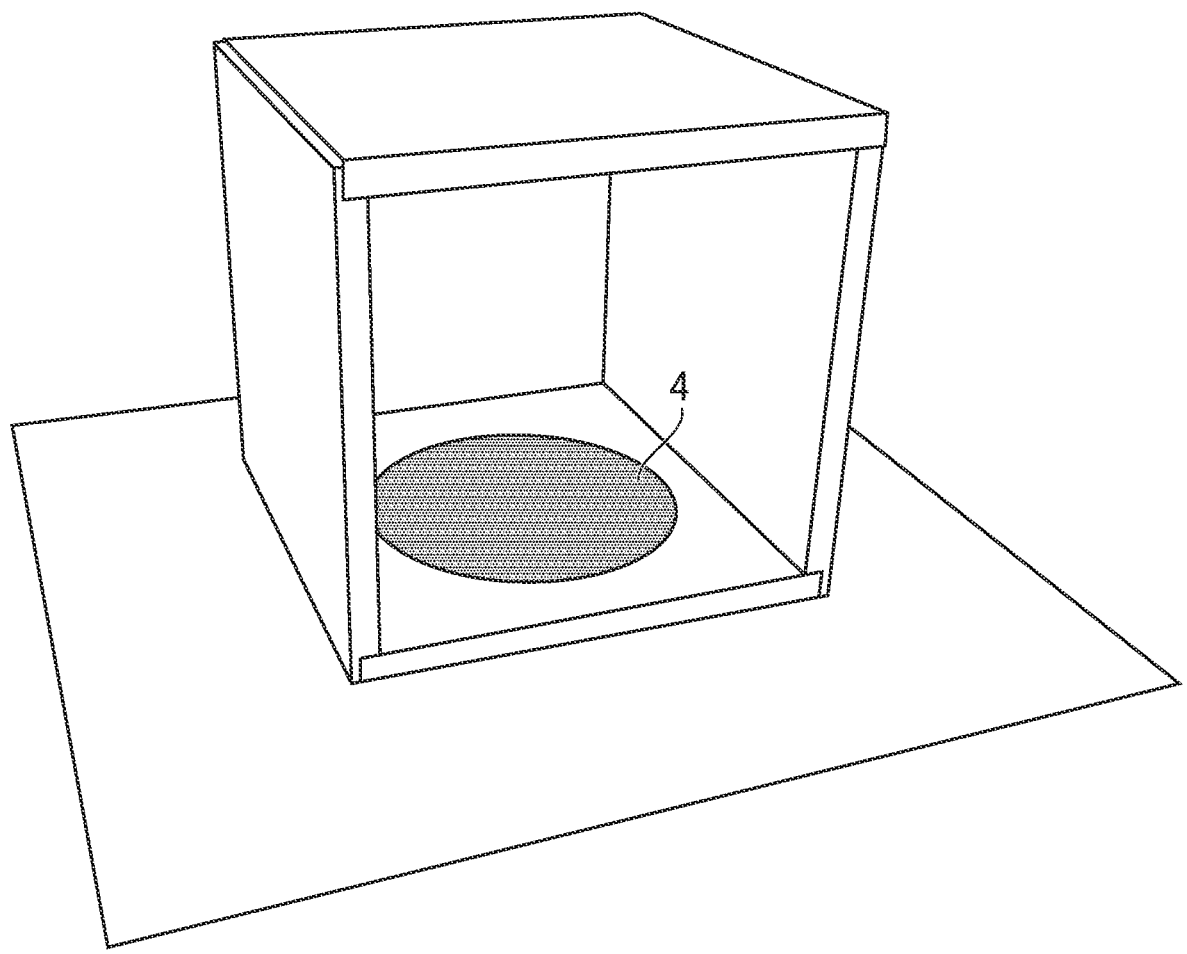
FIG. 4 is a diagram illustrating an example of a delivery port.
Figure 5:
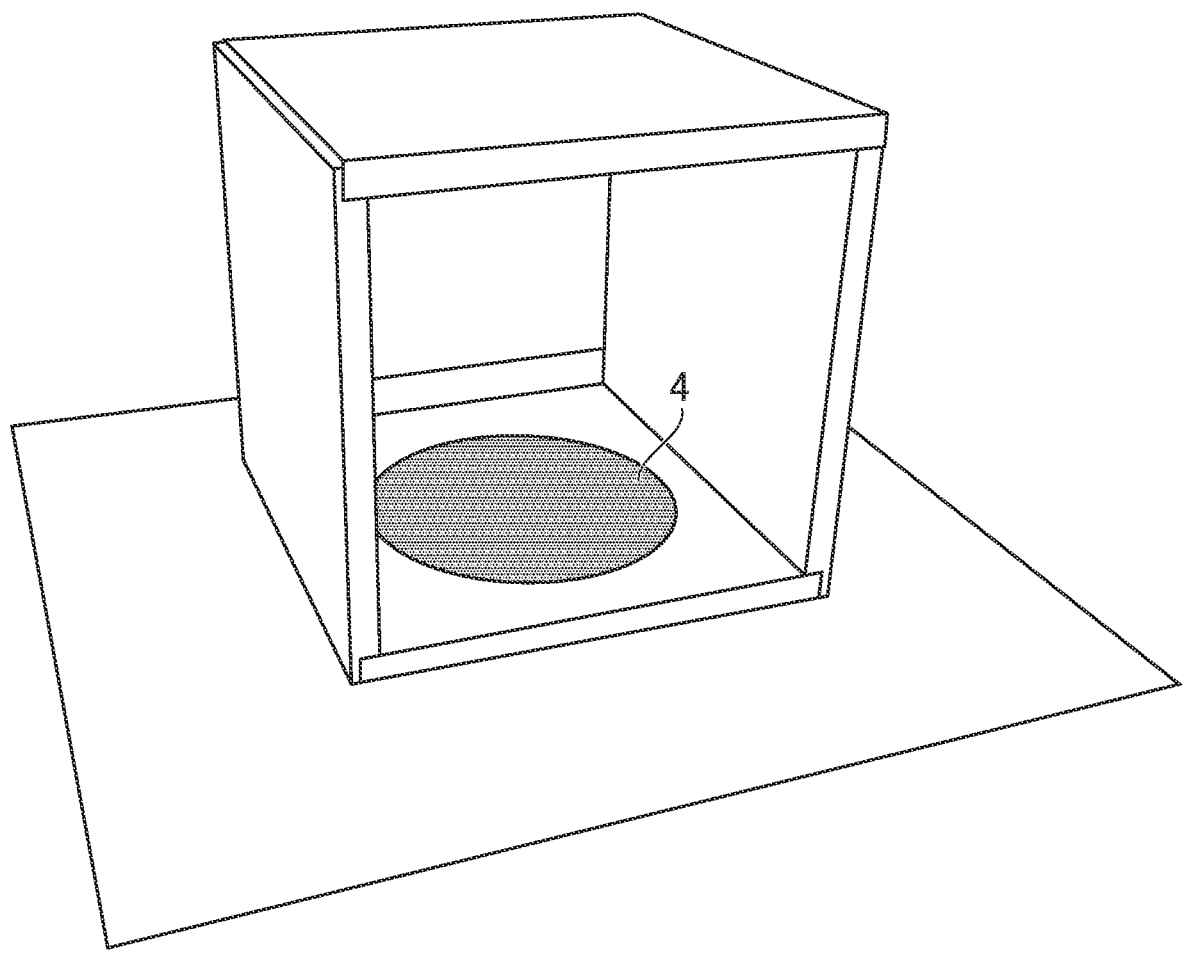
FIG. 5 is a diagram illustrating another example of a delivery port.

FIG. 4 is a schematic diagram illustrating an example of the delivery port 4, and FIG. 5 is a schematic diagram illustrating another example of the delivery port 4. FIG. 4 corresponds to a case where, for example, a room of an apartment house is used for the delivery port 4. In the delivery port 4 shown in FIG. 4, when the UAV 1 enters from a certain direction and delivers the package, the UAV 1 leaves so as to return to the direction in which the UAV 1 has entered. In this case, the approachable direction is narrowed. FIG. 5 corresponds to a case where the delivery port 4 is installed in a place having few obstacles, such as a rooftop. In the delivery port 4 shown in FIG. 5, the approachable direction is wide, and the UAV 1 can pass over the delivery port 4.

In this embodiment, when the package is transported, the control system 7 starts the UAV 1 without specifying the delivery port 4 to which the UAV 1 delivers the package. The delivery port 4 to which the UAV 1 delivers the package is specified when the UAV 1 approaches the facility, more specifically, when the UAV 1 reaches the connection area T as shown in FIG. 2, for example. In the following, the processing of the facility management system 2 in such a case will be described.

Figure 6:
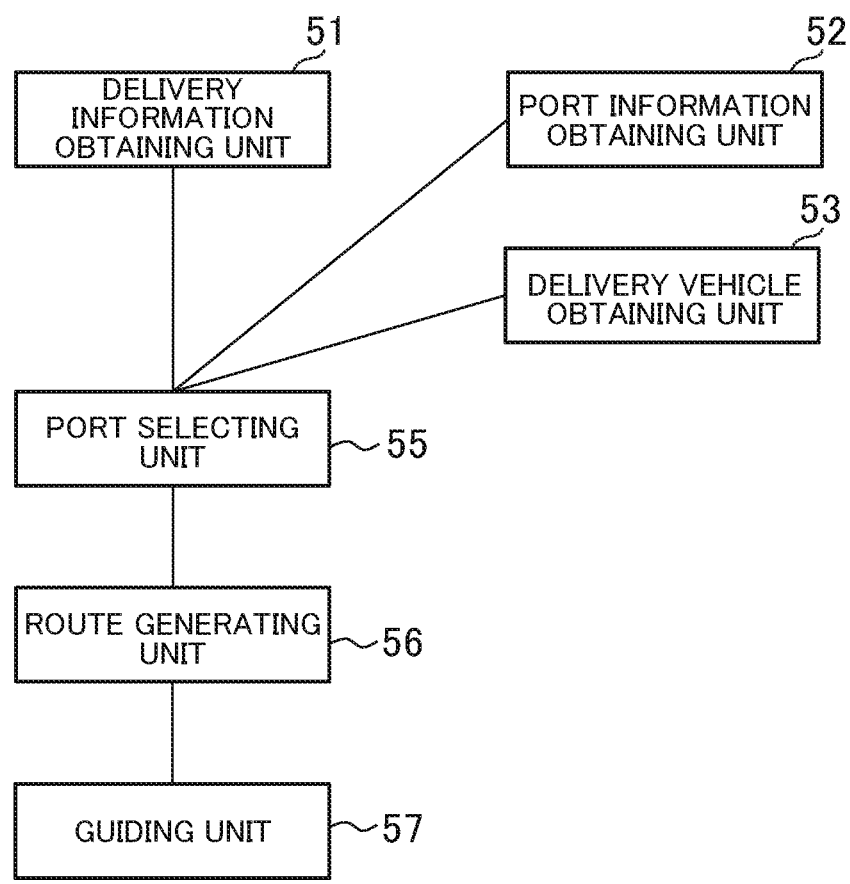
FIG. 6 is a block diagram showing functions implemented in a facility management system.

FIG. 6 is a block diagram showing functions implemented in the facility management system 2. The facility management system 2 functionally includes a delivery information obtaining unit 51, a port information obtaining unit 52, a delivery vehicle obtaining unit 53, a port selecting unit 55, a route generating unit 56, and a guiding unit 57. These functions are implemented when the processor 31 included in the facility management server 3 executes the program stored in the storage unit 32, and controls the communication unit 33 and the input/output unit 34. These functions may be implemented when the processors 31 included in a plurality of servers execute the program.

The delivery information obtaining unit 51 obtains delivery information of the UAV 1 approaching the facility. The delivery information includes a delivery destination of the package that is transported by the UAV 1, a current position of the UAV 1, and port restricting information. The delivery information obtaining unit 51 may obtain the delivery information after the UAV 1 has departed for the facility. The delivery information obtaining unit 51 may obtain the delivery information directly from the UAV 1 that reaches the connection area T through wireless communications, or may obtain the delivery information from the control system 7 when the UAV 1 reaches the connection area T. The delivery information obtaining unit 51 may obtain the delivery information other than the current position before the departure. In this case, the delivery information obtaining unit 51 may separately obtain the current position of the UAV 1 that has reached the connection area T.

The port restricting information is information for restricting the delivery port 4 to which the package is delivered, and includes a size and remaining battery charge of the UAV 1, whether the UAV 1 can pass over the delivery port 4, and whether the UAV 1 can drop the package. Whether the UAV 1 can drop the package indicates that whether there is no problem in dropping the package in the sky. The delivery information obtaining unit 51 may not need to obtain information other than the delivery destination. For example, if the position where the UAV 1 always passes is determined, the information of the present position is unnecessary, and if only the general delivery ports 4 are installed, the information of the size of the UAV 1 is unnecessary.

The port information obtaining unit 52 obtains information of a plurality of delivery ports 4. The delivery port 4 is for receiving the package. The delivery ports 4 are located at different positions. The port information obtaining unit 52 obtains information on characteristics of a port as shown in FIG. 3 as information on a delivery port 4, and obtains information indicating whether the delivery port 4 is available from the sensor 41 of the delivery port 4.

The delivery vehicle obtaining unit 53 obtains a position of the unmanned delivery vehicle 5. The unmanned delivery vehicle 5 transports the package received in one of the delivery ports 4 to a delivery destination. If the facility management system 2 has no unmanned delivery vehicle 5 and the package is delivered by a person, such a function may not be necessary.

After the UAV 1 has departed for the facility of the facility management system 2, the port selecting unit 55 selects a delivery port 4 to which the UAV 1 delivers the package among the plurality of delivery ports 4 based on the obtained delivery information, information on the delivery ports 4, and the position of the unmanned delivery vehicle 5. The port selecting unit 55 may not use the information on the delivery port 4 or the information on the unmanned delivery vehicle 5. The port selecting unit 55 may select a delivery port 4 to which the package is delivered further based on the current position of the UAV 1. The port selecting unit 55 may select a delivery port 4 based only on the delivery destination of the package. "After the UAV 1 has departed for the facility of the facility management system 2" may be, more specifically, when the UAV 1 has reached the connection area T, and may be after the delivery information obtaining unit 51 has obtained the delivery information of the UAV 1 that has reached the connection area T.

The route generating unit 56 generates a flight route 71 on which the UAV 1 flies to the selected delivery port 4. In the case where the delivery information includes the current position of the UAV 1, the route generating unit 56 generates a flight route 71 based on the current position of the UAV 1 and the selected delivery port 4. Further, the route generating unit 56 generates a flight route 71 that avoids obstacles in the facility and reaches the selected delivery port 4.

The guiding unit 57 sends the flight route 71 to the UAV 1. The flight route 71 is information for guiding the UAV 1 to the selected delivery port 4.

Figure 7:
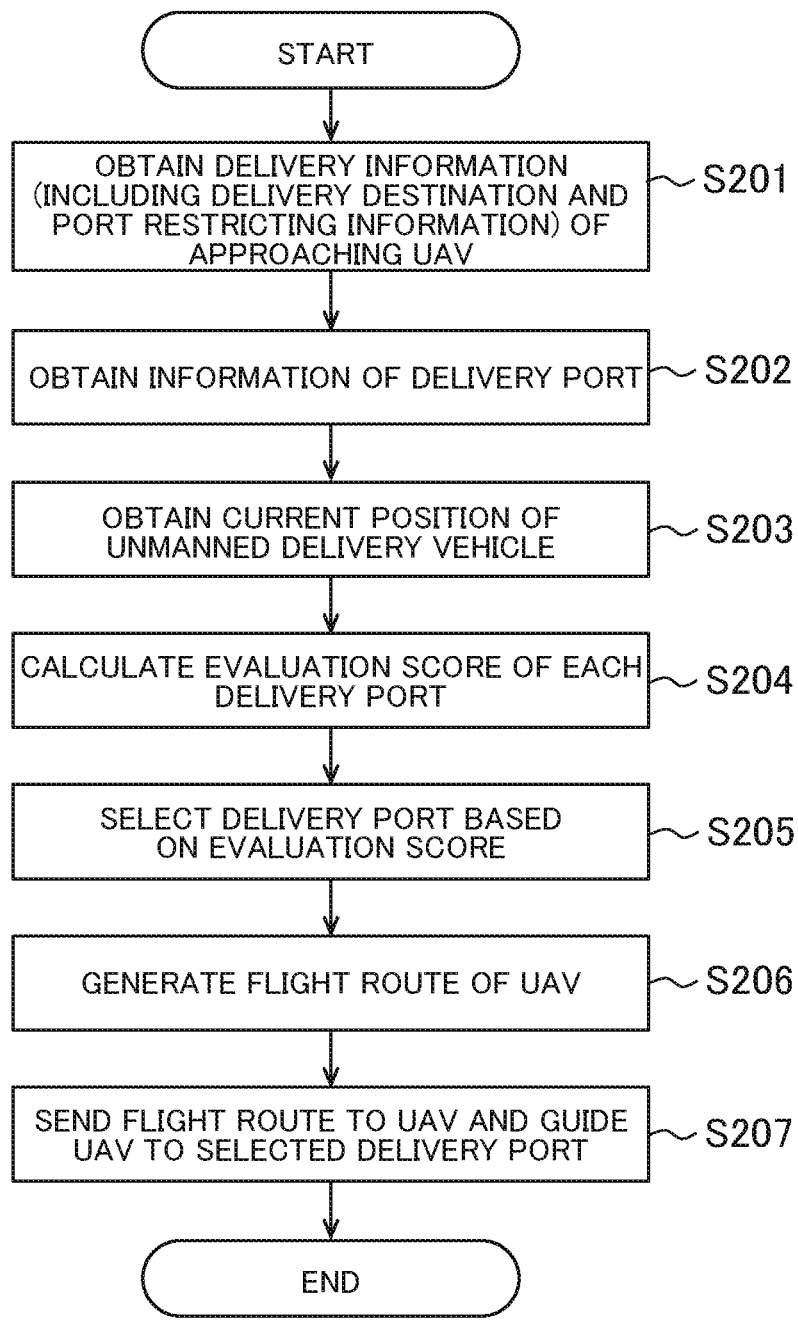
FIG. 7 is a flow chart showing an example of processing of the facility management system.

FIG. 7 is a flow chart showing an example of processing of the facility management system 2. The processing shown in FIG. 7 is repeatedly executed each time the UAV 1 approaches the facility. For example, the processing shown in FIG. 7 may be initiated by a notification from the control system 7 when the control system 7 detects that the UAV 1 has reached the connection area T. Alternatively, the processing may be triggered by the UAV 1 sending information directly to the antenna of the facility management system 2.

First, the delivery information obtaining unit 51 obtains delivery information of the UAV 1 approaching the facility (step S201). As described above, the delivery information includes the delivery destination, the current position of the UAV 1, and the port restricting information. The delivery information obtaining unit 51 may obtain the delivery information other than the current position before the UAV 1 reaches the connection area T, and obtain the current position after the UAV 1 reaches the connection area T.

The port information obtaining unit 52 obtains information of the delivery port 4 (step S202). The delivery vehicle obtaining unit 53 obtains the current position of the unmanned delivery vehicle 5 (step S203). The delivery vehicle obtaining unit 53 may obtain information on whether the unmanned delivery vehicle 5 is delivering the package, and if delivering the package, may obtain information on the delivery destination.

When the information indicated in steps S201 to S203 is obtained, the port selecting unit 55 calculates an evaluation score of each delivery port 4 (step S204). An evaluation score of a delivery port 4 indicates the degree of appropriateness as to whether the delivery port 4 receives the package from the approaching UAV 1. In the following, a case will be described in which the higher the evaluation score for a certain delivery port 4 is, the higher the suitability of the delivery port 4. In a case where the lower the evaluation score for a certain delivery port 4 is, the higher the suitability of the delivery port 4, the calculation of the evaluation score may be performed so that the increase or decrease of values is reversed.

Figure 8:
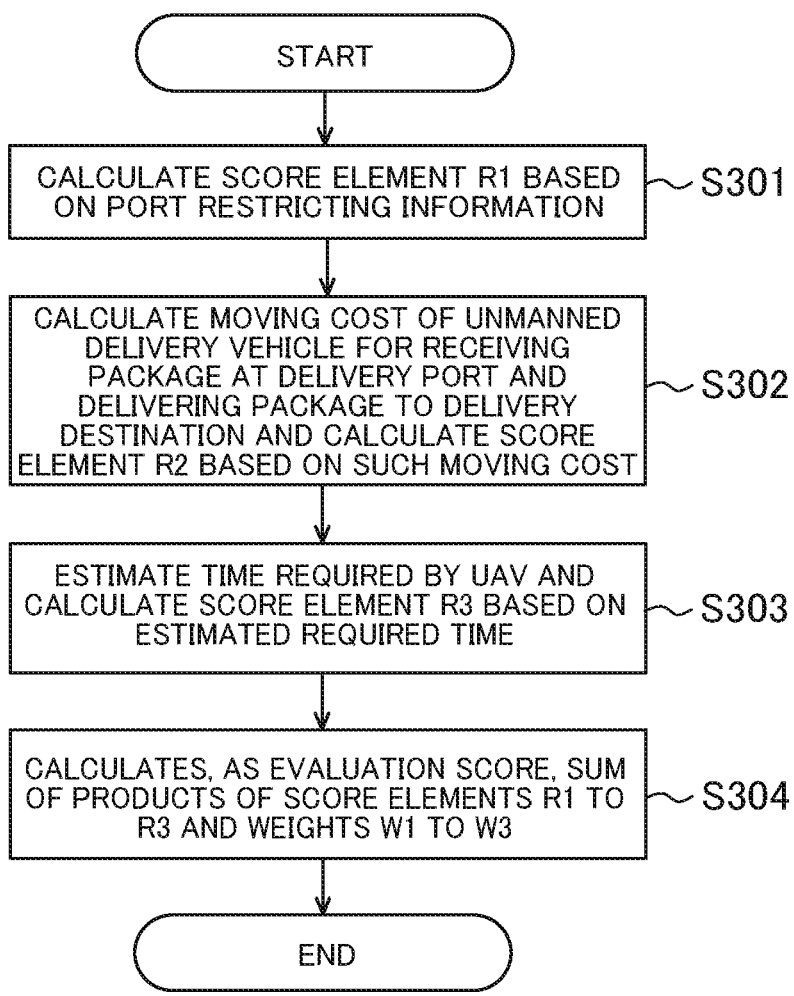
FIG. 8 is a flow chart showing an example of processing of the facility management system.

FIG. 8 is a flow chart showing an example of processing of the facility management system 2, and explains the processing in step S204 in more detail.

The port selecting unit 55 calculates a score element R1 based on the port restricting information and the delivery port information (step S301). If the data included in the delivery port restricting information indicates the package can be dropped, the port selecting unit 55 increases the score element R1 of the delivery port 4 in which the package can be dropped, and if a size of the drone included in the port restricting information is not small, the port selecting unit 55 significantly reduces the score element R1 of the delivery port 4 where the allowable size is small. If the remaining battery charge included in the port restricting information is small, the port selecting unit 55 increases the score element R1 of the delivery port 4 where the battery can be charged.

The port selecting unit 55 may calculate the score element R1 based on the information obtained from the sensor 41 of the delivery port 4 as to whether the delivery port 4 is available. For example, the port selecting unit 55 may significantly reduce the score element R1 when the delivery port 4 is not available.

If the size of the drone is not small and the allowable size of the delivery port 4 is small, or if the delivery port 4 is not available, the port selecting unit 55 may eliminate such a delivery port 4 from the candidates of delivery ports 4 to which the UAV 1 is directed, and may not calculate the evaluation score of the delivery port 4.

Further, the port selecting unit 55 calculates a score element R2 based on the current position of the unmanned delivery vehicle 5 and the delivery destination (step S302). More specifically, the port selecting unit 55 calculates a moving cost when the unmanned delivery vehicle 5 receives a package at the delivery port 4 and delivers the package to a delivery destination of the package. The port selecting unit 55 then calculates the score element R2 based on the moving cost. When the moving cost is lower, the score element R2 is higher. The port selecting unit 55 calculates the moving cost based on the travel distance of the unmanned delivery vehicle 5 and the movement between floors by the elevator.

Figure 9:
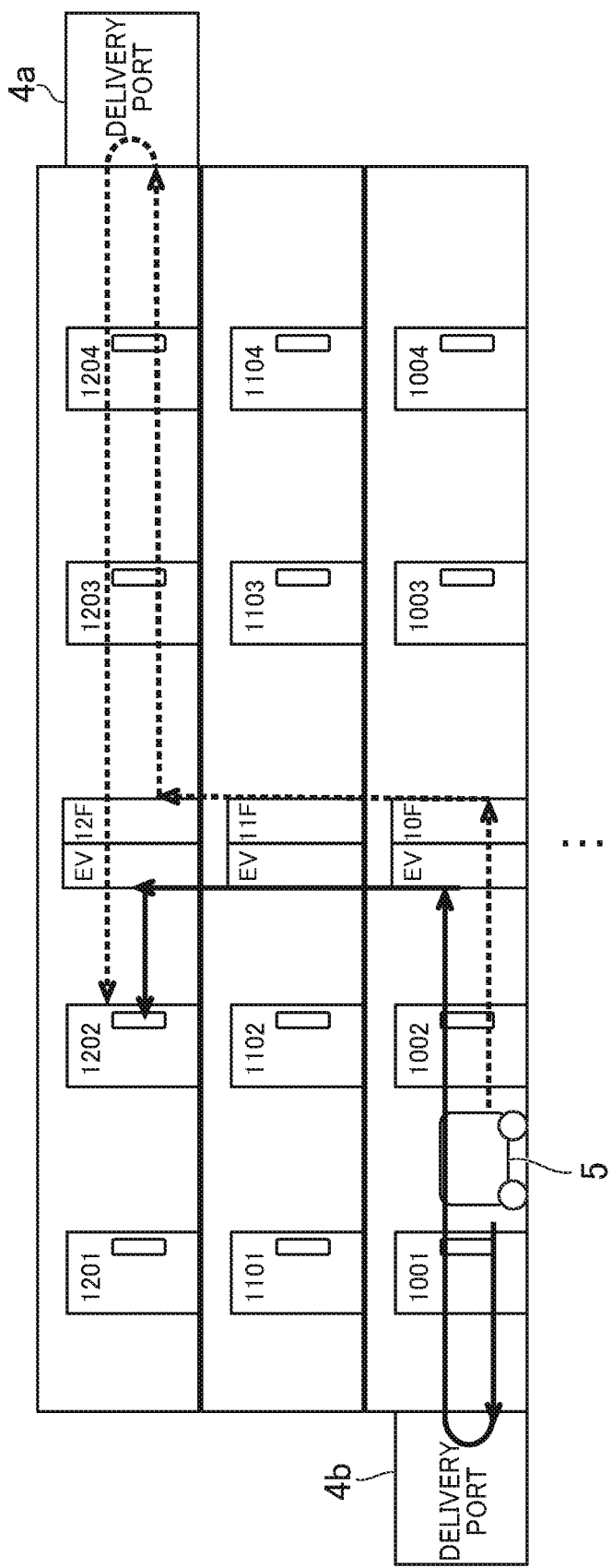
FIG. 9 is a diagram illustrating an example of the inside of the facility.

FIG. 9 is a schematic diagram showing an example of the inside of the facility, and is a diagram for explaining the moving cost of the unmanned delivery vehicle 5. In FIG. 9, assume that the delivery destination of the package is the room 1202, and the unmanned delivery vehicle 5 is located on the 10th floor. In a case where the unmanned delivery vehicle 5 is located at the position shown in FIG. 9, the moving cost is lower when the unmanned delivery vehicle 5 receives a package at a delivery port 4b, which is closest to the unmanned delivery vehicle 5, than when the unmanned delivery vehicle 5 receives the package at a delivery port 4a, which is closest to the delivery destination. When calculating the moving cost, the port selection unit 55 may exclude, from the moving cost, the amount corresponding to the time when the UAV 1 is predicted to reach the delivery port 4.

The port selecting unit 55 estimates the time required by the UAV 1 based on the current position of the UAV 1 and the arrangement of the delivery ports 4, and calculates a score element R3 based on the estimated required time (step S303). When the estimated required time is shorter, the score element R3 is higher.

When the score elements R1 to R3 are calculated, the port selecting unit 55 multiplies the score elements R1 to R3 by weights W1 to W3 respectively and calculates the sum of the products as an evaluation score (step S304). The weights W1 to W3 are positive real numbers that are statistically or empirically determined.

When the evaluation score is calculated, the port selecting unit 55 selects a delivery port 4 based on the evaluation score among the plurality of delivery ports 4 (step S205). Specifically, the port selecting unit 55 selects the delivery port 4 having the highest evaluation score.

When the delivery port 4 is selected, the route generating unit 56 generates a flight route 71 by which the UAV 1 reaches the selected delivery port 4 (step S206). If the current position of the UAV 1 is obtained, the route generating unit 56 may generate a flight route 71 from the current position to the selected delivery port 4. If the current position is not obtained, the route generating unit 56 may set a predetermined passing position, and generate a flight route 71 from the passing position to the selected delivery port 4. In the latter flight route 71, the UAV 1 moves from the current position to the passing position, and then flies along the flight route 71.

Figure 10:
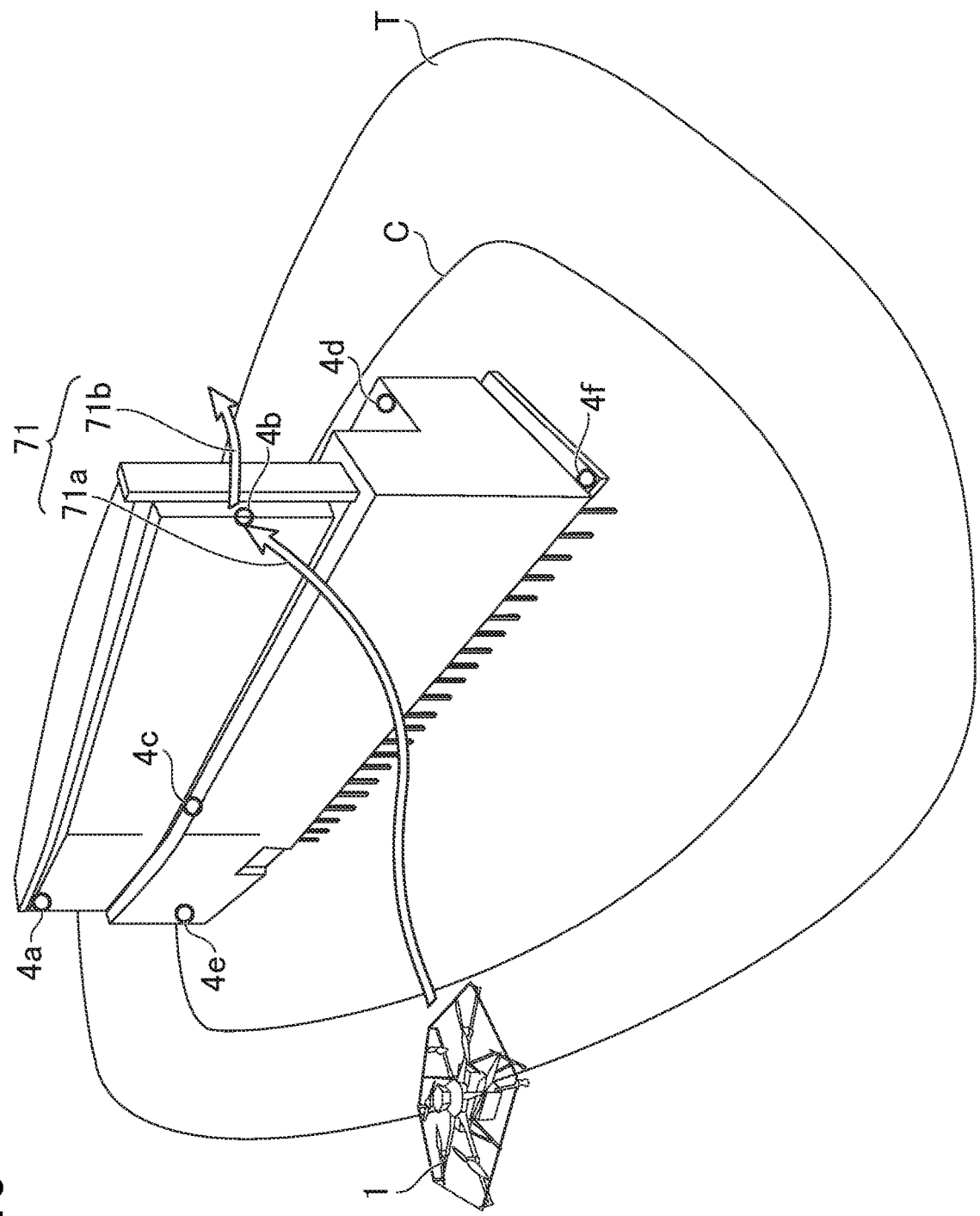
FIG. 10 is a diagram illustrating an example of a generated flight route.

FIG. 10 is a diagram illustrating an example of a generated flight route 71. The flight route 71 includes a partial route 71a from the current position to the selected delivery port 4, and a partial route 71b from the delivery port 4, to which the package is delivered, to the point where the UAV 1 leaves the facility management area C. The flight route 71 also includes an instruction to land the delivery port 4 or to drop off the package.

Needless to say, the flight route 71 generated by the generating unit 56 leads the UAV 1 to the selected delivery port 4 while avoiding obstacles (e.g., buildings) in the facility. As such, standard flight routes may be respectively made for combinations of a plurality of positions in the connection area T and a plurality of delivery ports 4 in advance, and the route generating unit 56 may select a standard flight route that corresponds to the current position of the UAV 1 and the selected delivery port and generate a flight route 71 based on the selected standard flight route. Further, standard flight routes of different altitudes may be generated for each combination so as to prevent collision with other UAVs 1. In this case, the route generating unit 56 selects a standard flight route using an altitude that is different from other UAVs 1.

The route generating unit 56 may each time generate a flight route 71 that connects the selected delivery port 4 to the current position and does not go into the no-fly zone.

When the flight route 71 is generated, the guiding unit sends the generated flight route 71 to the UAV 1, and guides the UAV 1 to the selected delivery port 4 (step S207). The guiding unit 57 may directly send the flight route 71 to the UAV 1 through wireless communications, or through the control system 7.

When the UAV 1 approaches the facility after departing for the facility, a delivery port 4 to which the UAV 1 delivers a package is determined, and the UAV 1 is guided to the delivery port 4. This serves to reduce waiting time and operate the delivery port 4 and the UAV 1 more efficiently. The facility management system 2 manages the approach of the UAV 1 to the delivery port 4 instead of the control system 7, which manages the entire flight of the UAV 1, and thus the management more suited to the actual condition of the facility can be achieved.

The invention claimed is:

1. A delivery port management system, comprising:
   at least one processor; and
   at least one memory device that stores a plurality of instructions, which when executed by the at least one processor, causes the at least one processor to:
   obtain a delivery destination of a package that is transported by an autonomous unmanned aerial vehicle (UAV) approaching a facility having a plurality of delivery ports and a plurality of delivery destinations, the delivery ports receiving packages;
   calculate an evaluation score for each of the plurality of delivery ports;
      wherein the evaluation score is based on three elements;
      wherein a first element is based on a port restriction information and a delivery port information;
      wherein a second element is based on a current location of the autonomous UAV and a location of the delivery destination;
      wherein a third element is based on an estimate of a required time by the autonomous UAV based on the current position of the autonomous UAV and an arrangement of the delivery ports;
   select a delivery port to which the autonomous UAV autonomously delivers the package among the plurality of delivery ports based on the delivery destination of the package after the autonomous UAV has departed for the facility based on the evaluation scores;
   send information for guiding the autonomous UAV to the selected delivery port;
      wherein the autonomous UAV autonomously travels according to the information and autonomously delivers the package to the delivery destination;
      wherein each of the plurality of delivery ports are each of one of there are a plurality of port types;
      wherein a first port type has one entrance; and
      wherein a second port type has two entrances.

2. The delivery port management system according to claim 1, wherein
   the selection is executed after the autonomous UAV has reached an area that is set according to the facility.

3. The delivery port management system according to claim 1, wherein when executed by the at least one processor, the plurality of instructions cause the at least one processor to generate a flight route for the autonomous UAV to reach the selected delivery port.

4. The delivery port management system according to claim 3, wherein
   the flight route generation is based on a current position of the autonomous UAV and the selected delivery port.

5. The delivery port management system according to claim 3, wherein
the generated flight route avoids an obstacle in the facility and reaches the selected delivery port.

6. The delivery port management system according to claim 1, wherein
after the autonomous UAV has departed for the facility, the port selection is executed based on the delivery destination of the package and the current position of the autonomous UAV from the plurality of delivery ports.

7. The delivery port management system according to claim 1,
wherein when executed by the at least one processor, the plurality of instructions cause the at least one processor to operate to obtain a position of a delivery vehicle that delivers a package received at one of the plurality of delivery ports to a delivery destination,
wherein the selection is based on the delivery destination of the package and the position of the delivery vehicle from the plurality of delivery ports;
wherein the delivery vehicle is an unmanned delivery vehicle which can travel in the facility.

8. The delivery port management system according to claim 7,
wherein when executed by the at least one processor, the plurality of instructions cause the at least one processor to evaluate a route for the delivery vehicle to reach the delivery destination through each of the plurality of delivery ports, and
wherein the selection is based on the evaluation.

9. The delivery port management system according to claim 1,
wherein the three elements each have a weight value; and
wherein the evaluation score is a sum of the first element multiplied by a first weight value, the second element multiplied by a second weight value, and the third element multiplied by a third weight value.

10. The delivery port management system according to claim 1,
wherein there is a connection area around the facility; and
wherein the processor is configured to select the delivery port after the autonomous UAV has reached the connection area.

11. The delivery port management system according to claim 1,
wherein when the autonomous UAV reaches the connection area, control of the autonomous UAV is transferred to a facility management system.

12. The delivery port management system according to claim 1,
wherein the first port type is located within a building; and
wherein the second port type is located on a rooftop.

13. The delivery port management system according to claim 1, wherein the first element is further based on the port type.

14. A delivery port management method, comprising:
obtaining, with at least one processor operating with a memory device, a delivery destination of a package that is transported by an autonomous unmanned aerial vehicle (UAV) approaching a facility having a plurality of delivery ports and a plurality of delivery destinations, the delivery ports receiving packages;
calculating an evaluation score for each of the plurality of delivery ports;
wherein the evaluation score is based on three elements;
wherein a first element is based on a port restriction information and a delivery port information;
wherein a second element is based on a current location of the autonomous UAV and a location of the delivery destination;
wherein a third element is based on an estimate of a required time by the autonomous UAV based on the current position of the autonomous UAV and an arrangement of the delivery ports;
selecting, with at least one processor operating with a memory device, a delivery port to which the autonomous UAV autonomously delivers the package among the plurality of delivery ports based on the delivery destination of the package after the autonomous UAV has departed for the facility based on the evaluation scores;
sending, with at least one processor operating with a memory device, information for guiding the autonomous UAV to the selected delivery port; and
wherein the autonomous UAV autonomously travels according to the information and autonomously delivers the package to the delivery destination
wherein each of the plurality of delivery ports are each of one of a plurality of port types;
wherein a first port type has one entrance; and
wherein a second port type has two entrances.

15. A non-transitory computer readable storage medium storing a plurality of instructions, and when executed by at least one processor, the plurality of instructions cause the at least one processor to:
obtain a delivery destination of a package that is transported by an autonomous unmanned aerial vehicle (UAV) approaching a facility having a plurality of delivery ports and a plurality of delivery destinations, the delivery ports receiving packages;
calculate an evaluation score for each of the plurality of delivery ports;
wherein the evaluation score is based on three elements;
wherein a first element is based on a port restriction information and a delivery port information;
wherein a second element is based on a current location of the autonomous UAV and a location of the delivery destination;
wherein a third element is based on an estimate of a required time by the autonomous UAV based on the current position of the autonomous UAV and an arrangement of the delivery ports;
select a delivery port to which the autonomous UAV autonomously delivers the package among the plurality of delivery ports based on the delivery destination of the package after the autonomous UAV has departed for the facility based on the evaluation scores;
send information for guiding the autonomous UAV to the selected delivery port; and
wherein the autonomous UAV autonomously travels according to the information and delivers the package to the delivery destination
wherein each of the plurality of delivery ports are each of one of a plurality of port types;
wherein a first port type has one entrance; and
wherein a second port type has two entrances.

* * * * *